(12) United States Patent
Katz et al.

(10) Patent No.: US 8,463,875 B2
(45) Date of Patent: Jun. 11, 2013

(54) SYNCHRONIZED PLAYBACK OF MEDIA PLAYERS

(75) Inventors: Hagay Katz, Moshav Herut (IL); Eyal Bychkov, Hod Hasharon (IL); Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 12/850,804

(22) Filed: Aug. 5, 2010

(65) Prior Publication Data

US 2011/0047247 A1 Feb. 24, 2011

Related U.S. Application Data

(60) Provisional application No. 61/235,492, filed on Aug. 20, 2009.

(51) Int. Cl.
*G06F 15/16* (2006.01)
(52) U.S. Cl.
USPC .......................................................... 709/219
(58) Field of Classification Search
USPC .................................. 709/203–205, 248, 219
See application file for complete search history.

(56) References Cited

U.S. PATENT DOCUMENTS

| | | | |
|---|---|---|---|
| 7,571,014 B1 | 8/2009 | Lambourne et al. | |
| 7,747,338 B2* | 6/2010 | Korhonen | 700/94 |
| 2003/0200001 A1* | 10/2003 | Goddard | 700/94 |
| 2004/0052501 A1 | 3/2004 | Tam | |
| 2004/0156616 A1 | 8/2004 | Strub et al. | |
| 2005/0276570 A1 | 12/2005 | Reed, Jr. et al. | |
| 2006/0033809 A1* | 2/2006 | Farley | 348/14.01 |
| 2007/0053653 A1 | 3/2007 | Huntington | |
| 2007/0211907 A1 | 9/2007 | Eo et al. | |
| 2008/0013659 A1 | 1/2008 | Kim | |
| 2008/0013802 A1* | 1/2008 | Lee et al. | 382/118 |
| 2008/0037674 A1* | 2/2008 | Zurek et al. | 375/262 |
| 2008/0120401 A1* | 5/2008 | Panabaker et al. | 709/223 |
| 2008/0152165 A1* | 6/2008 | Zacchi | 381/77 |
| 2009/0002191 A1* | 1/2009 | Kitaura | 340/825.62 |
| 2009/0158382 A1* | 6/2009 | Shaffer et al. | 725/131 |
| 2010/0041330 A1* | 2/2010 | Elg | 455/3.06 |

* cited by examiner

*Primary Examiner* — Joshua Joo
(74) *Attorney, Agent, or Firm* — Soquel Group LLC

(57) ABSTRACT

A method for synchronized playback of media players, including selecting, by each of a plurality of media players, a multimedia file to be played, monitoring, by each of the plurality of media players, the environment for an external trigger, and upon detection of the external trigger, playing, by each of the plurality of media players, the selected multimedia file.

9 Claims, 5 Drawing Sheets

SYNCHRONIZED PLAYBACK OF MEDIA PLAYERS

CROSS REFERENCES TO RELATED APPLICATIONS

This application claims benefit of U.S. Provisional Application No. 61/235,492, entitled SYNCHRONIZED PLAYBACK OF MEDIA PLAYERS, filed on Aug. 20, 2009 by inventors Hagay Katz, Eyal Bychkov and Uri Ron.

FIELD OF THE INVENTION

The field of the present invention is media players.

BACKGROUND OF THE INVENTION

Many mobile electronic devices today include media players, such as MP3 players. Standalone music players such as the iPod®, cell phones such as the iPhone™, PDAs and other such devices enable users to listen to their music content and, for some devices, to watch their video content.

Such music players, unless connected to an amplifier, have an anti-social nature to them. Typically, a group of users may be in the same room, each with his headphones on listening to his own content, with no interaction between the users.

In order to enhance enjoyment of media content by groups of users, it would be of advantage to be able to coordinate playback of content in synchronization, so that each user hears/sees the same content in unison. It would also be of advantage for a group of users to be able to play related content on each of their media players, together in concert.

SUMMARY OF THE DESCRIPTION

Aspects of the present invention relate to a group of users, each having a media player, who would like to play a multimedia file together in unison. Each media player has a "sync" mode which, when activated, controls the media players to play multimedia files simultaneously in synchronization.

In one embodiment of the present invention, synchronization is achieved by using an external sound, such as a clap or a whistle, to trigger each media player to start playing its multimedia file. The external sound trigger may be generated manually by a human being, or may be generated by a device.

There may be slight discrepancies between the times that each media player begins playing due to speed of sound and processing speeds of the players, but generally the discrepancies are on the order of a few tens of milliseconds, which are not discernible by the human ear. Moreover, the discrepancies may be reduced in whole or in part by cross-correlating the audio outputs between the players, and automatically advancing some of the players forward by slight amounts to maximize the cross-correlations. Alternatively, some of the players may be forwarded manually by slight amounts to reduce the discrepancies.

In another embodiment of the present invention, synchronization is achieved by a media player recording audio output from a leader's media player, identifying a song from the audio output, and then playing the song, or a multimedia file corresponding to the song, such as a movie having the song as accompaniment.

In another embodiment of the present invention, the media players include cameras, and synchronization is achieved by using a visual effect, such as a person raising his hand or turning his hand from side to side, a person smiling, or a device lighting its screen with a specific color or displaying a specific shape on its screen. An example of smile detection is the "smile shutter" mode of Sony Corporation's W-series digital compact cameras.

In another embodiment of the present invention, the media players have proximity sensors, and when the media players are in close proximity of one another, such as 1 cm apart, they begin playing the multimedia file.

In another embodiment of the present invention, the media players have Bluetooth, IR or such other wireless signal detectors, and are triggered to begin playing the multimedia file upon mutual signal detection.

The present invention addresses usage scenarios in which the song, and its corresponding multimedia file, to be played in synchronization by the media players is known a priori, and scenarios in which the song is not known a priori and must be identified by the media players. The present invention also addresses usage scenarios in which the start points where the media players begin playing the song are known a priori, and scenarios in which the start points are not known a priori and must be determined by the media players.

In some embodiments of the present invention the media players communicate with a server computer that runs an application to identify a song based on a recorded portion of the song.

There is thus provided in accordance with an embodiment of the present invention a method for synchronized playback of media players, including selecting, by each of a plurality of media players, a multimedia file to be played, monitoring, by each of the plurality of media players, the environment for an external trigger, and upon detection of the external trigger, playing, by each of the plurality of media players, the selected multimedia file.

There is additionally provided in accordance with an embodiment of the present invention a method for synchronized playback of media players, including selecting, by each of a plurality of media players, a multimedia file to be played, generating, by one of the plurality of media players, an audio tone, monitoring, by the others of the plurality of media players, the environment to detect the generated audio tone, and upon detection of the generated audio tone, playing, by the others of the plurality of media players, the selected multimedia file.

There is further provided in accordance with an embodiment of the present invention a method of synchronized playback of media players, including recording, by a media player, an audio portion of a song from a known multimedia file being played by another player device, analyzing the recorded audio portion to determine a start point within the multimedia file related to the recorded audio portion, and playing the multimedia file on the media player, beginning from the determined start point within the file.

There is yet further provided in accordance with an embodiment of the present invention a method of synchronized playback of media players, including recording, by a media player, an audio portion of a song being played by another media player, analyzing the recorded audio portion to identify the song, and to identify a multimedia file corresponding to the song, further analyzing the recorded audio portion to determine a start point within the multimedia file related to the recorded audio portion, and playing the multimedia file on the media player, beginning from the determined start point within the file.

There is moreover provided in accordance with an embodiment of the present invention a method of synchronized playback of media players, including recording, by a media player, an audio portion of a song being played by another media player, sending the recorded audio portion to a server computer, receiving information identifying the song from the server computer, identifying a multimedia file corresponding to the identified song, analyzing the recorded audio portion to determine a start point within the multimedia file based on the recorded audio portion, and playing the multimedia on the media player, beginning from the determined start point within the file.

There is additionally provided in accordance with an embodiment of the present invention a method of synchronized playback of media players, including recording, by a media player, an audio portion of a song being played by another media player, sending the recorded audio portion to a server computer, receiving information (i) identifying the song, and (ii) identifying a location within the song related to the recorded audio portion, from the server computer, identifying a multimedia file corresponding to the identified song, determining a start point within the multimedia file based on the identified location, and playing a multimedia file corresponding to the identified song on the media player, beginning from the determined start point.

BRIEF DESCRIPTION OF THE DRAWINGS

The present invention will be more fully understood and appreciated from the following detailed description, taken in conjunction with the drawings in which.

DETAILED DESCRIPTION

Figure 1:
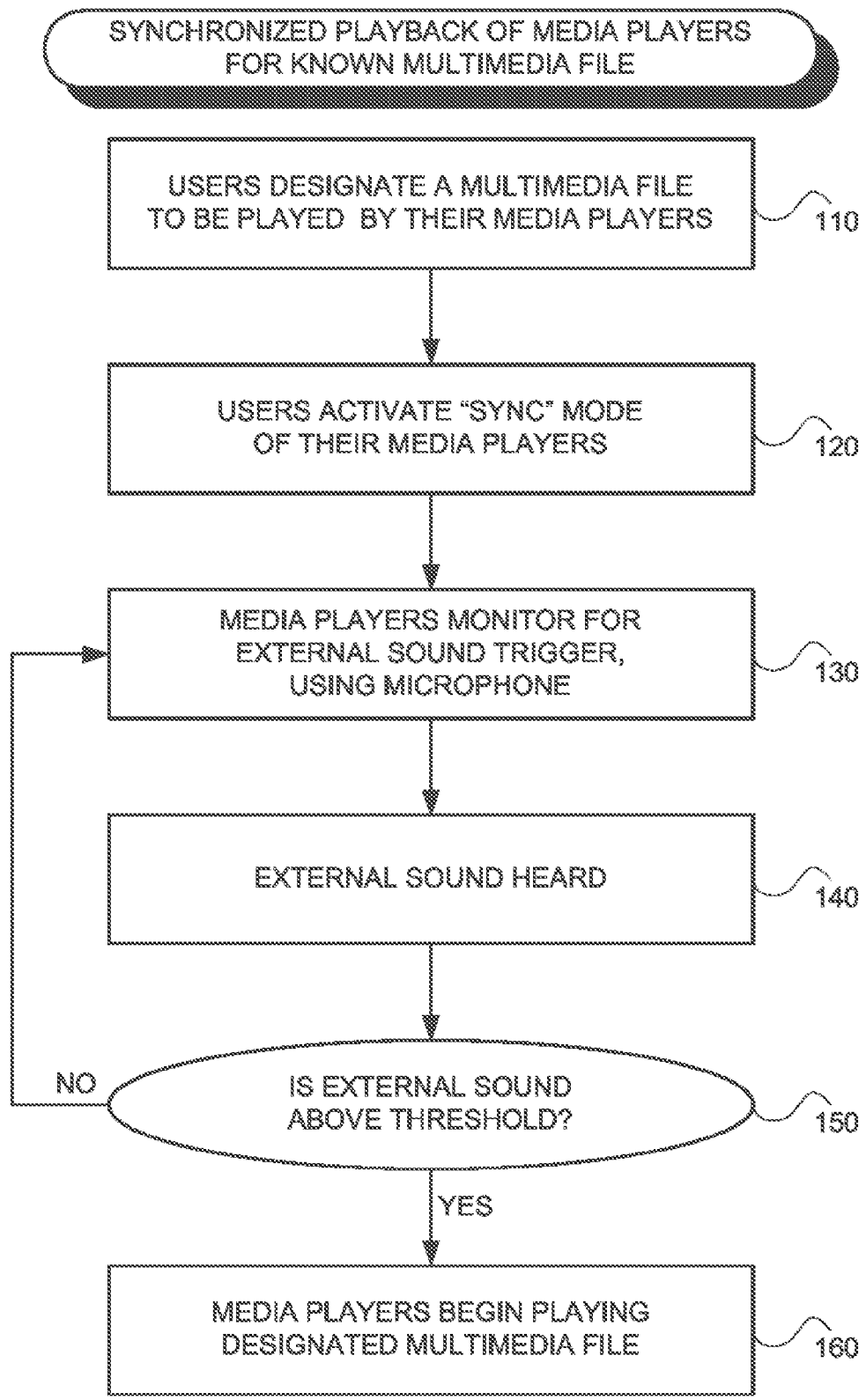
FIG. 1 is a simplified flowchart of a first method for synchronizing playback of media players, for a multimedia file that is known a priori, in accordance with an embodiment of the present invention.

Aspects of the present invention relate to two or more users who each have media players, and would like to enjoy a piece of media content together in unison. Embodiments of the present invention introduce a "sync" mode for the media players. When in sync mode, the media players are controlled so as to play the same multimedia file, or related multimedia files, simultaneously in synchronization. In the case of related multimedia files, the media players play the multimedia files together in concert. A multimedia file may include a song, a movie, a video clip, a slide show, or such other content.

There are several different usage scenarios that arise in synchronization of playback of media players. In some scenarios, the multimedia file to be played is known a priori by each media player. In other scenarios, the multimedia file to be played is not known a priori by each media player, and has to be identified. In some scenarios, each multimedia player begins its playback from the beginning of the multimedia file, or from such other start point that is known a priori. In other scenarios, some or all of the media players need to determine a start point in the multimedia file, from which to begin playback, in order to ensure synchronization.

Synchronizing of Playback when the Multimedia File is Known a Priori

In one embodiment of the present invention, an external sound, such as a clap or a whistle, triggers each media player to begin playing a designated multimedia file at the same moment, or nearly the same moment. The media players begin their playback either immediately upon recognition of the external sound, or at a predetermined time delay thereafter. Each media player begins playing the multimedia file from the beginning of the file, or from a start point within the file that is known a priori. The discrepancies between the times that each media player begins playing are generally on the order of a few tens of milliseconds, which is too short to be discernible by the human ear.

In addition, the discrepancies can be partially or completely compensated, by analyzing cross-correlation of audio outputs between the media players, to automatically forward each media player by a slight amount to maximize cross-correlation, or by manually forwarding each media player by a slight amount.

In another embodiment of the present invention, one of the media players plays an audio tone, which serves as a trigger for the other media players to begin playing the designated multimedia file.

In another embodiment of the present invention, the media players include cameras, and synchronization is achieved by using a visual effect, such as a person raising his hand or turning his hand from side to side, a person smiling, or a device lighting its screen with a specific color or displaying a specific shape on its screen. An example of smile detection is the "smile shutter" mode of Sony Corporation's W-series digital compact cameras.

In another embodiment of the present invention, the media players have proximity sensors, and when the media players are in close proximity of one another, such as 1 cm apart, they begin playing the multimedia file.

In another embodiment of the present invention, the media players have Bluetooth, IR or such other wireless signal detectors, and are triggered to begin playing the multimedia file upon mutual signal detection.

For purposes of clarity, the ensuing description relates to audio triggers, but it will be appreciated by those skilled in the art that the present invention applies to other types of triggers, including inter alia visual triggers, proximity triggers and wireless signal detection triggers, as mentioned hereinabove.

Reference is made to FIG. 1, which is a simplified flowchart of a first method for synchronizing playback of media players, for a multimedia file that is known a priori, in accordance with an embodiment of the present invention. In the usage scenario of FIG. 1, each of a plurality of users has a media player, and the users would like to play a designated multimedia file simultaneously together, in synchronization. The media file may include a song, a movie, a video clip, a slide show, or such other content.

At step 110 each of the users designates a multimedia file for playback by his media player. At step 120 each of the users activates a "sync" mode of his media player. When sync mode is activated, each media player, at step 130, using its microphone, monitors its surrounding for an external sound, used to trigger start of playback. The external sound trigger may be inter alia, a clap or a whistle. The external sound trigger may be generated manually, or may be generated by a device.

When an external sound is heard at step 140, each media player, at step 150, determines whether or not the sound heard is above a threshold. If so, then at step 160 the media player begins playback of the selected multimedia file. If not, then processing returns to step 130, for further monitoring.

According to another embodiment of the present invention, the sound that triggers the media players to begin their playback at step 130 is generated by one of the media players, instead of being an external sound. The media player that generates the trigger sound may be a pre-designated media player. Alternatively, the media player that generates the trigger sound may be randomly selected. E.g., each media player may select a random number, n, such as a number from 1-20, and countdown n seconds before generating the trigger sound. The one or more media players that generate the trigger sound first thus trigger the other media players to begin playback of the designated multimedia file.

It will be appreciated that the method of FIG. 1 is also of advantage in situations when the users select different multimedia files at step 110, to be played synchronously in concert. For example, three users from a barber shop trio may each record their own part of the trio on their media players, and use the method of FIG. 1 for playback of the three parts in unison.

It will be appreciated that there may be slight discrepancies in the exact times at which each media player begins playing, due to several factors. Such factors include (i) the speed of sound, (ii) latencies in detecting the external sound, and (iii) different processing speeds among the players. However, the discrepancies are on the order of a few tens of milliseconds, which generally is not discernable by the human ear.

Specifically, regarding (i), the speed of sound in air is on the order of 1100 ft/sec. As such, if the distances between media players are on the order of 10 ft, then the discrepancies due to the speed of sound are less than 9 msec.

According to embodiments of the present invention, the discrepancies between the media players may be compensated in part or in whole. In one embodiment, the users adjust delays between the devices manually, such as by forwarding the playback to advance a short time. In another embodiment, applicable to multimedia files with audio portions, the media players automatically adjust their delays by detecting cross-correlations between their audio outputs, and advancing the playback to maximize the cross-correlations. For multimedia files with video portions, the media players may automatically adjust their delays based on cross-correlations between the video outputs.

Regarding (ii), monitoring devices generally sample background noise in small discrete time intervals, such as intervals of 20 msec. As such, every 20 msec a device analyzes the previous 20 msec to detect presence of the external sound. Only after detecting the external sound, does the device begin its playback. However, it will be appreciated by those skilled in the art, that upon detecting the external sound, the device is able to identify the exact time the external sound was sampled. Thus the device is able to delay playback until a fixed delay, such as 30 msec, after this exact time, and thereby eliminate discrepancies among media players due to sampling latencies. Notationally, first and second media players may detect at different respective times, T1 and T2, that the external sound was sampled at time T, where T1 and T2 are greater than T but less than, say, T+20 msec. As such, both players are able to begin their playback at the same time, say, T+30 msec. It will be appreciated by those skilled in the art that since playback begins 30 msec after the external sound was sampled, synchronization of playback is assured regardless of whether or not the clocks of the media players are synchronized to the same time of day.

Further regarding (ii), some latency may be inherent due to the length of the external sound, which generally spans several samples. Such latency may be reduced by identifying a peak amplitude of the external sound, and using the time of the peak as the exact trigger.

Regarding (iii), different media players may require different times to prepare for playback. Such discrepancies may be reduced or eliminated by preparing the designated multimedia file for playback in advance, such as by pre-caching the multimedia file.

In another embodiment of the present invention, a leader media player starts playing a known multimedia file, and the other media players determine start points within the multimedia file so that the other players can play the multimedia file in synchronization with the leader media player.

Figure 2:
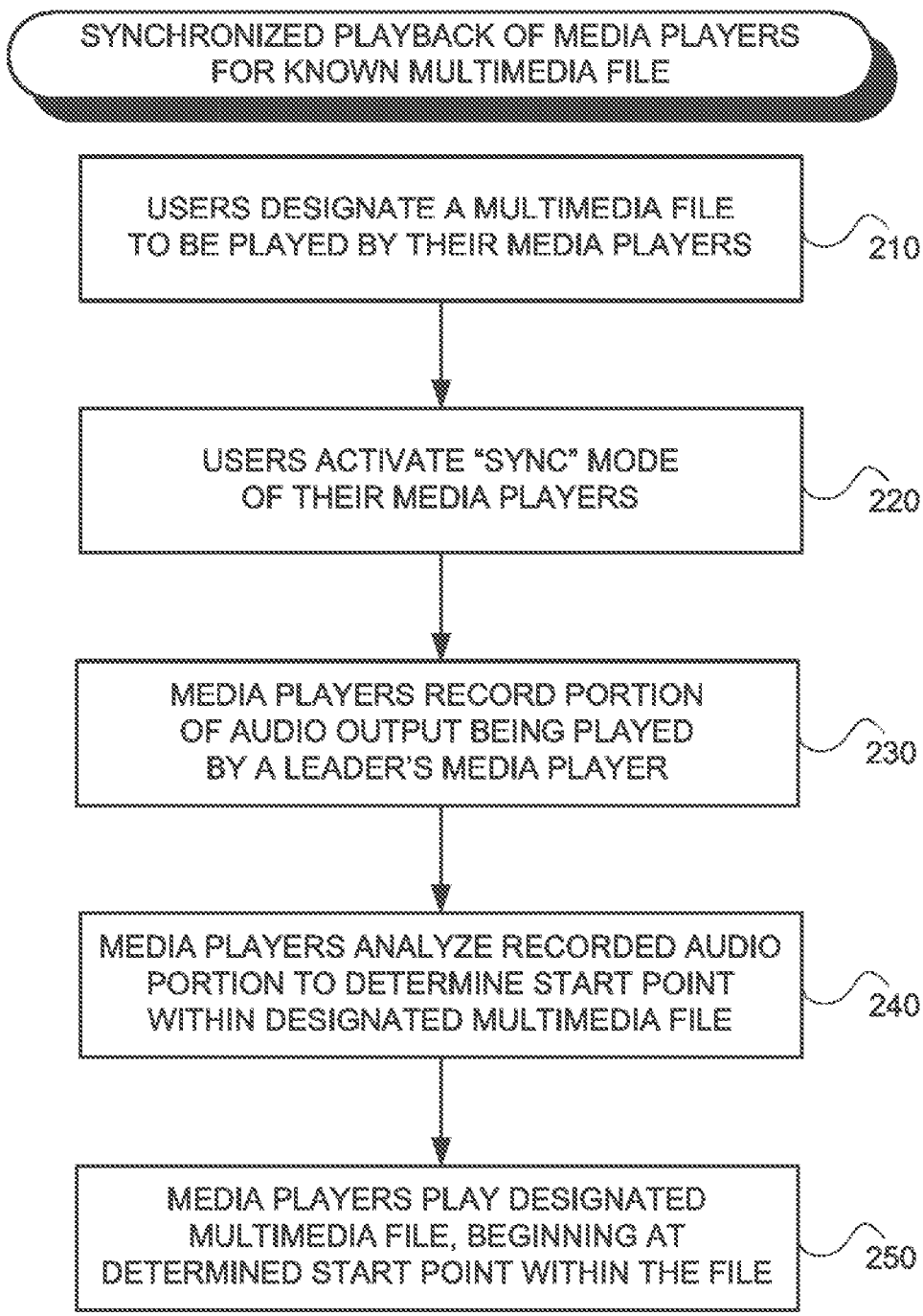
FIG. 2 is a simplified flowchart of a second method for synchronizing playback of media players, for a multimedia file, that is known a priori, in accordance with an embodiment of the present invention.

In this regard, reference is made to FIG. 2, which is a simplified flowchart of a second method for synchronizing playback of media players, for a multimedia file that is known a priori, in accordance with an embodiment of the present invention. In the usage scenario of FIG. 2, one user, referred to as the "leader", begins playing the multimedia file on his media player. Other users who have media players would like to join in and play the multimedia file together with the leader, in synchronization. The method of FIG. 2 applies to multimedia files that include an audio component, such as a song or a movie with a soundtrack.

At step 210 one or more users, who want to join in with the leader, designate the known multimedia file for playback. At step 220 the users activate a "sync" mode of their media players. At step 230 the media players record a portion of the audio output from the leader's media player.

At step 240 each media player analyzes the recorded audio portion to identify a start point within the multimedia file from where to begin, so that the playback is synchronized with the leader. In one implementation of step 240, a time-based location, T, of the recorded audio portion within the song or soundtrack is determined; and a timer, ΔT, runs from the beginning of step 220 until the end of step 240 to measure the elapsed time therebetween. Upon determination of T, the media player begins, at step 250, playback of the multimedia file from time T+ΔT within the file, which matches the current play position of the leader's media player.

Synchronizing of Playback when the Multimedia File is Unknown a Priori

In one embodiment of the present invention, one or more media players record a portion of audio for a song that is output by a leader's media player, and identify the song being played by the leader. The media players also determine start points within the song, from which to begin playback in order to synchronize with the leader. Identification of the song from the recorded audio output may be performed by the media players themselves. In another embodiment, identification of the song from the recorded audio output may be performed by a server computer in communication with the media players.

Figure 3:
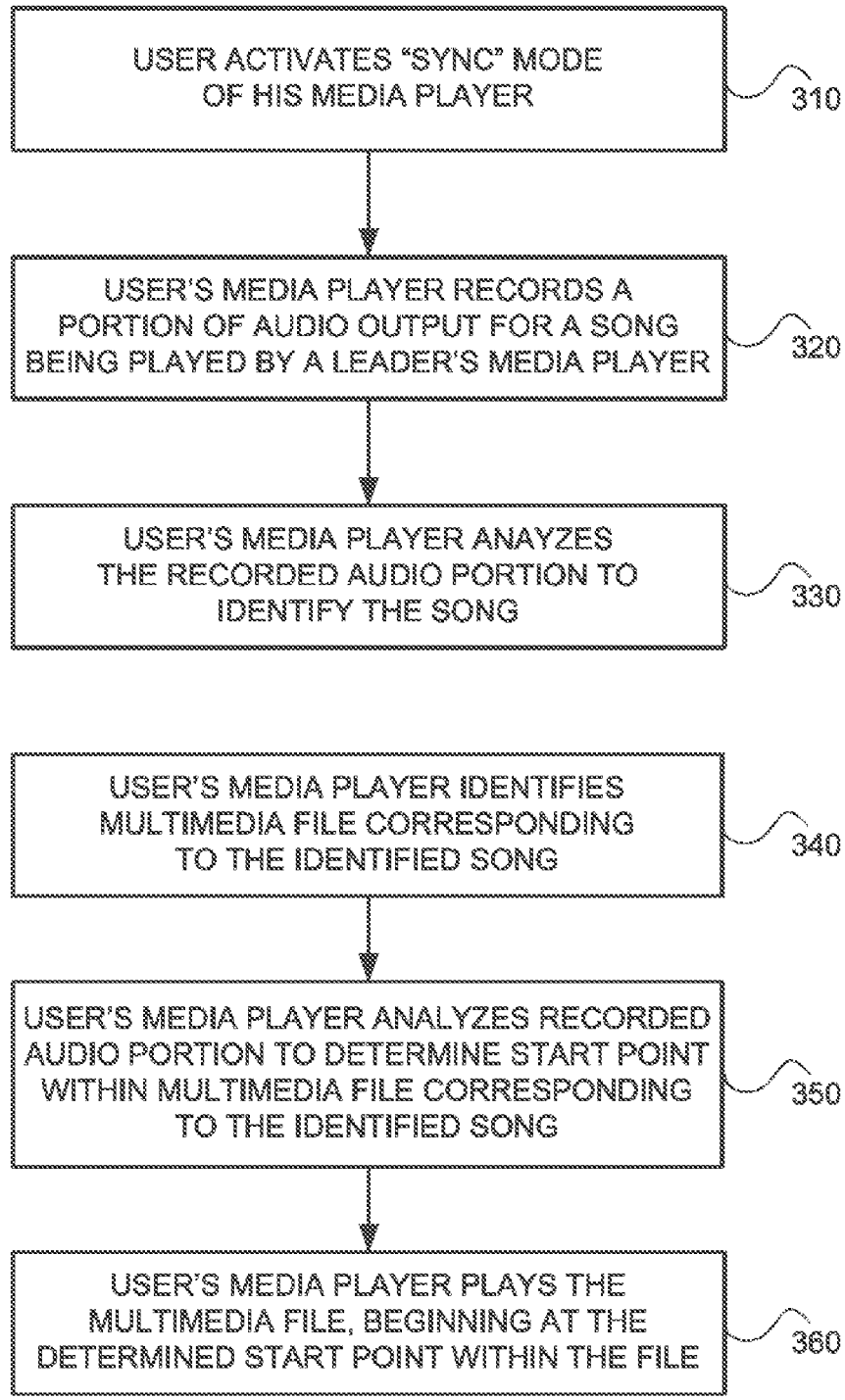
FIG. 3 is a simplified flowchart of a first method for synchronizing playback of media players, for a multimedia file that is unknown a priori, in accordance with an embodiment of the present invention.

Reference is made to FIG. 3, which is a simplified flowchart of a first method for synchronizing playback of media players, for a multimedia file that is unknown a priori, in accordance with an embodiment of the present invention. In the usage scenario of FIG. 3, one user, referred to as the "leader", beings playing a multimedia file on his media player. Other users who have media players would like to join in and play the multimedia file, which is unknown a priori, together with the leader, in synchronization. The method of FIG. 3 applies to multimedia files that include an audio component, such as a song or a movie with a soundtrack.

As in the method of FIG. 2 above, a leader's media player begins playing a multimedia file. At step 310, a user, who wants to join in with the leader, activates a "sync" mode of his media player. In turn, at step 320 the user's media player records a portion of audio for a song that is being played by the leader's media player. At step 330 the user's media player analyzes the recorded audio portion to identify the song, and at step 340 the user's media player identifies a multimedia file corresponding to the song. The multimedia file may be inter alia the song itself, or a movie with the song as accompaniment.

At step 350 the user's media player analyzes the recorded audio portion to determine a start point within the multimedia file from where to begin, so that playback is synchronized with the leader. In a time-based implementation, a timer, ΔT, measures the elapsed time from the beginning of step 310 until the end of step 350 when a time-based location, T, of the recorded audio portion within the song is determined. Upon determination of T, the media player, at step 360, begins playback of the multimedia file from time T+ΔT within the file, which matches the current play position of the leader.

Figure 4:
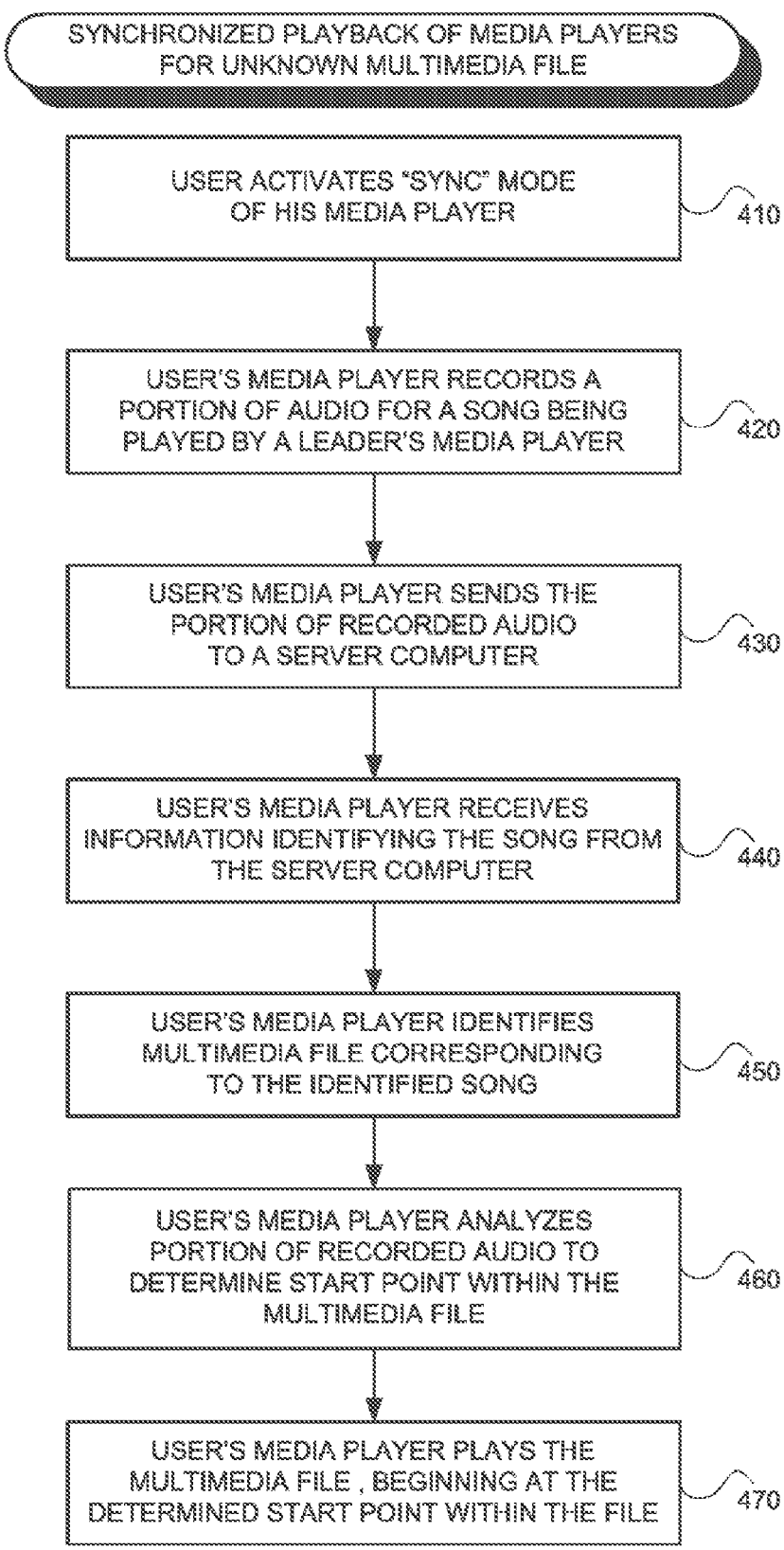
FIG. 4 is a simplified flowchart of a second method for synchronizing playback of media players, for a multimedia file that is unknown a priori, in accordance with an embodiment of the present invention.

Reference is made to FIG. 4, which is a simplified flowchart of a second method for synchronizing playback of media players, for a multimedia file that is unknown a priori, in accordance with an embodiment of the present invention. In the usage scenario of FIG. 4, one user, referred to as the "leader", begins playing a multimedia file on his media player. Other users who have media players would like to join in and play the multimedia file, which is unknown a priori, together with the leader, in synchronization. The method of FIG. 4 applies to multimedia files that include an audio component, such as a song or a movie with a soundtrack.

As above, a leader's media player begins playing a multimedia file. At step 410, a user activates a "sync" mode of his media player. In turn, at step 420 the user's media player records a portion of audio for a song that is being played by the leader. At step 430 the user's media player sends the portion of recorded audio to a server computer. The server computer analyzes the portion of recorded audio, to identify the song that is being played. The server computer may use inter alia an application such as the Tunatic™ application, which identifies a song from a portion of a recording thereof.

At step 440 the media player receives information identifying the song, from the server computer, and at step 450 the media player identifies a multimedia file corresponding to the song. The multimedia file may be inter alia the song itself, or a movie with the song as accompaniment.

At step 460 the user's media player analyzes the portion of recorded audio to identify a start point within the multimedia file from where to begin, so that playback is synchronized with the leader. In a time-based implementation, a timer, ΔT, measures the elapsed time from the beginning of step 410 until the end of step 460 when a time, T, of the portion of recorded audio within the song is determined. Upon determination of T, the media player, at step 470, begins playback of the multimedia file from time T+ΔT within the file, which matches the current play position of the leader.

Whereas the media player determines the start point at step 460, in a variant of the method of FIG. 4 the location of the recorded audio portion within the song may be provided by the server computer instead.

Figure 5:
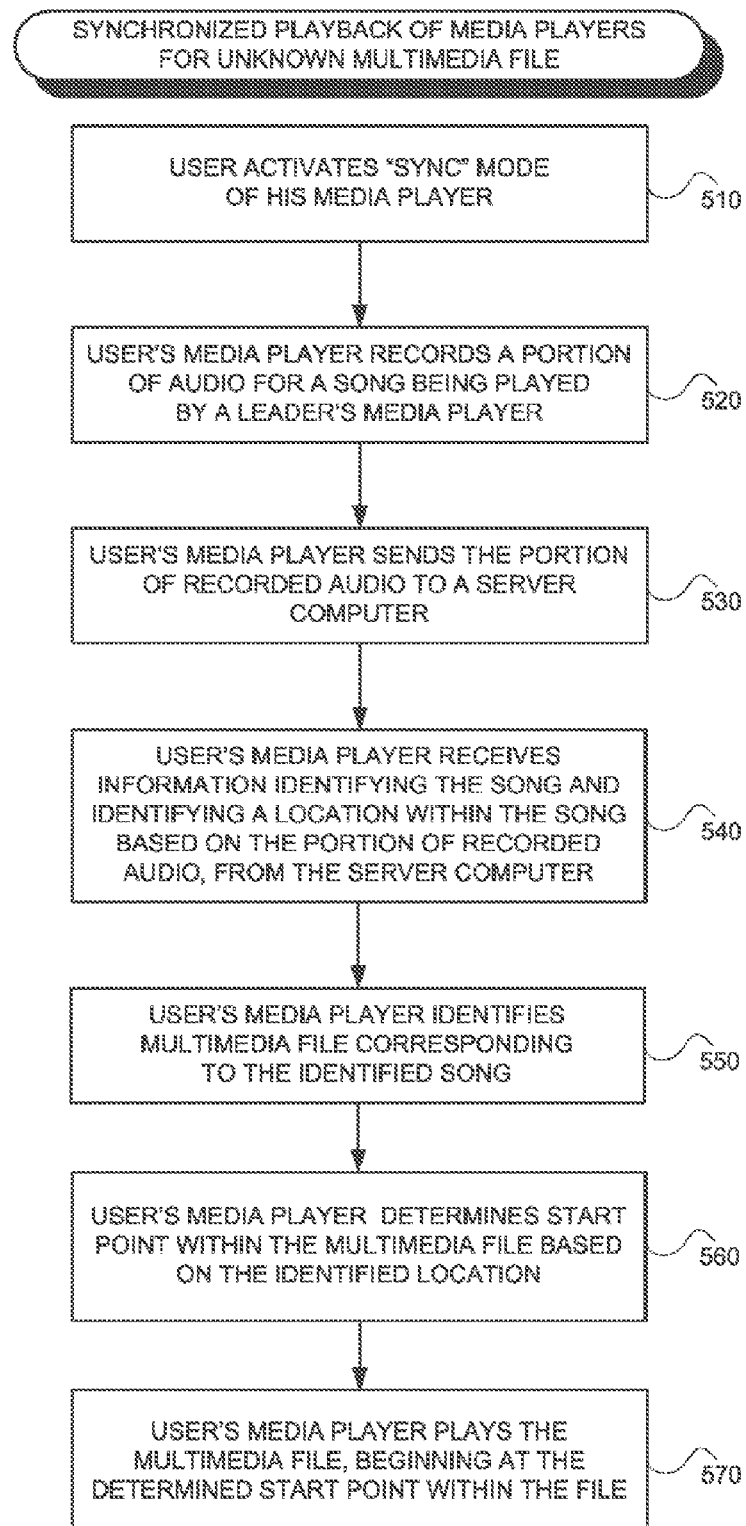
FIG. 5 is a simplified flowchart of a third method for synchronizing playback of media players, for a multimedia file that is unknown a priori, in accordance with an embodiment of the present invention.

In this regard, reference is made to FIG. 5, which is a simplified flowchart of a third method for synchronizing playback of media players, for a multimedia file that is unknown a priori, in accordance with an embodiment of the present invention. In the usage scenario of FIG. 5, one user, referred to as the "leader", begins playing a multimedia file on his media player. Other users who have media players would like to join in and play the multimedia file, which is unknown a priori, together with the leader, in synchronization. The method of FIG. 5 applies to multimedia files that include an audio component, such as a song or a movie with a soundtrack.

As above, a leader's media player begins playing a multimedia file. At step 510, a user, who wishes to join in with the leader, activates a "sync" mode of his media player. In turn, at step 520 the user's media player records a portion of audio for a song that is being played by the leader's media player. At step 530 the user's media player sends the portion of the recorded audio to a server computer. The server computer analyzes the portion of the recorded audio, to identify the song that is being played. The server computer may use inter alia an application such as the Tunatic™ application, which identifies a song from a portion of a recording thereof. The server computer also identifies the location of the portion of the recorded audio within the song. At step 540 the media player receives information identifying the song and the location of the portion of recorded audio within the song, from the server computer.

At step 550 the media player identifies a multimedia file corresponding to the song. The multimedia file may be inter alia the song itself, or a movie with the song as accompaniment. At step 560 the media player determines a start point within the multimedia file, based on the identified location received from the server computer. The start point may be a time-based location T+ΔT, where T is the time-based location provided by the server computer at step 540, and ΔT is provided by a timer that runs from the beginning of step 510 to the end of step 560 to measure the time elapsed therebetween.

At step 570 the media player plays the multimedia file beginning from the determined start location within the file.

In another embodiment of the present invention, the media players may synchronize themselves with a television, a radio or such other entertainment device. In this embodiment, the media players record a portion of audio output from the television or radio or other entertainment device at step 320, 420 and 520, instead of from the leader's media player.

In another embodiment of the present invention, synchronization between media players is achieved via digital communication between the devices, such as Bluetooth® communication.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for synchronized playback of a plurality of media players, comprising:
   selecting, by each of the plurality of media players, a multimedia file to be played;
   generating, by one of the media players, an audio tone; and
   playing, by the one media player, after generation of the audio tone and waiting until a fixed delay, the multimedia file selected by the one media player; and
   each media player from the plurality of media players other than the one media player:
      monitoring an environment to detect the generated audio tone;
      determining a time that the audio tone was generated; and
      upon detection of the generated audio tone, waiting until the fixed delay after the determined time that the audio tone was generated, then playing the selected multimedia file.

2. The method of claim 1 wherein the one media player that generates the audio tone is a pre-determined media player.

3. The method of claim 1 wherein the one media player that generates the audio tone is randomly determined using random numbers.

4. The method of claim 1 wherein each media player plays the selected multimedia file from the beginning of the file.

5. The method of claim 1 wherein each media player plays the selected multimedia file from a known start point within the file.

6. A method for synchronized playback of a plurality of media players, comprising:

selecting, by each of the plurality of media players, a multimedia file to be played;

generating, by one of the media players, an audio tone; and each media player from the plurality of media players other than the one media player:

monitoring an environment to detect the generated audio tone;

determining a time that the audio tone was generated; and upon detection of the generated audio tone, waiting until a fixed delay after the determined time that the audio tone was generated, wherein all of the media players other than the one media player use the same fixed delay, and then playing the selected multimedia file, wherein the one media player that generates the audio tone is randomly determined using random numbers.

7. The method of claim 6 further comprising playing, by the one media player that generates the audio tone, after generation of the audio tone and waiting the fixed delay, the selected multimedia file.

8. The method of claim 6 wherein each other media player from the plurality of media players other than the one media player plays the selected multimedia file from the beginning of the file.

9. The method of claim 6 wherein each other media player from the plurality of media players other than the one media player plays the selected multimedia file from a known start point within the file.

\* \* \* \* \*